US007227448B2

(12) United States Patent
Menard et al.

(10) Patent No.: US 7,227,448 B2
(45) Date of Patent: Jun. 5, 2007

(54) SECURE SYSTEM FOR THE CONTROL OF THE UNLOCKING OF AT LEAST ONE OPENABLE PANEL OF A MOTOR VEHICLE

(75) Inventors: Eric Menard, Lesigny (FR); Colin Smith, Nuneaton-Warwickshire (GB)

(73) Assignee: Valeo Electronique, Creteil (FR)

( * ) Notice: Subject to any disclaimer, the term of this patent is extended or adjusted under 35 U.S.C. 154(b) by 699 days.

(21) Appl. No.: 09/883,963

(22) Filed: Jun. 20, 2001

(65) Prior Publication Data

US 2002/0163420 A1 Nov. 7, 2002

(51) Int. Cl.
*B60R 25/00* (2006.01)
*G05B 19/00* (2006.01)

(52) U.S. Cl. .................... 340/5.72; 340/5.26; 340/10.1

(58) Field of Classification Search ............... 340/5.72, 340/825.69, 72; 364/724; 375/1
See application file for complete search history.

(56) References Cited

U.S. PATENT DOCUMENTS 5,420,925 A * 5/1995 Michaels ..................... 380/23
5,479,442 A * 12/1995 Yamamoto .................. 375/150
5,736,935 A * 4/1998 Lambropoulos ....... 340/825.69
6,057,779 A * 5/2000 Bates ........................ 340/5.21

FOREIGN PATENT DOCUMENTS

| | | |
|---|---|---|
| FR | 2628471 | 9/1989 |
| FR | 2678755 | 1/1993 |
| GB | 1595797 | 8/1981 |

OTHER PUBLICATIONS

R.E. Ziemer, Digital Communications and Spread Spectrum Systems, 1985,Macmillan Publishing Company, pp. 336-337.*

* cited by examiner

*Primary Examiner*—Michael Horabik
(74) *Attorney, Agent, or Firm*—Berenato, White & Stavish

(57) ABSTRACT

A system for controlling locking/unlocking of at least one openable panel of a vehicle is provided. The system is especially designed to prevent unauthorized persons from intercepting and copying signals transmitted between the vehicle and a transmission/reception device held by the user.

15 Claims, 2 Drawing Sheets

SECURE SYSTEM FOR THE CONTROL OF THE UNLOCKING OF AT LEAST ONE OPENABLE PANEL OF A MOTOR VEHICLE

The present invention relates to secure systems for the control of the unlocking of at least one openable panel of a motor vehicle.

In the remote control systems which are currently used for unlocking motor vehicle doors, the user must manually actuate his remote control (transmission/reception device integrated into the gripping part of his mechanical key) in order to actuate the unlocking of the doors.

Now, for greater user comfort, one wishes to eliminate manipulations of this type.

So-called "hands free" systems in which the user carries a transponder which is, for example, integrated into a badge have recently been proposed.

On receiving a radio frequency interrogation signal transmitted from the vehicle, the transponder transmits a radio frequency identification signal from itself in response. When this signal is received and identified by means provided for this purpose on the vehicle, these means order the unlocking of the openable panel.

Such a system is fully transparent to the user, since the unlocking of the doors is controlled without the user having to perform operations other than that consisting in his having to manipulate the handle of his door.

Such "hands free" systems pose security problems, however.

In particular, certain "ill-intentioned" persons may copy the interrogation signal transmitted from the vehicle so as to retransmit it near the transponder, even though the user carrying this transponder is somewhere far removed from the vehicle. By deploying suitable means near the user, they store the identification signal transmitted in response by the transponder and retransmit this signal in the vicinity of the vehicle so as to obtain the unlocking of the latter's doors.

A purpose of the invention is to propose a solution making it possible to prevent deceptions of this type.

Accordingly, the invention proposes a system for the control of means for locking/unlocking at least one openable panel of a vehicle, in particular an automobile, comprising transmission/reception means which are carried by the vehicle and transmission/reception means which are intended to be carried by a user and which, on receipt of an interrogation signal transmitted by the transmission/reception means of the vehicle, are intended to transmit a response signal able to control the actuation of the unlocking of the openable panel, characterized in that the transmission/reception means on the vehicle and the transmission/reception means of the user each comprise memory means forming a circular shift register in which are stored at least one and the same pseudo-random code, the transmission/reception means on the vehicle comprising means for transmitting an interrogation signal which carries a pseudo-random code of this kind, the transmission/reception means of the user comprising means for de-spreading the signal received if the pseudo-random code carried by the said signal is synchronized with a corresponding pseudo-random code stored in their memory means and furthermore comprising means for transmitting a signal in response which signal carries a pseudo-random code and which furthermore carries a signature which is specific to the said transmission/reception means of the user, the transmission/reception means on the vehicle comprising means for de-spreading the signal received if the pseudo-random code carried by the said signal is synchronized with a corresponding pseudo-random code stored in their memory means and for verifying whether the signal received carries the signature of the transmission/reception means of the user.

Other characteristics and advantages of the invention will further become apparent from the description which follows which is purely illustrative and nonlimiting and which should be read in conjunction with the appended drawings, in which.

Figure 1:
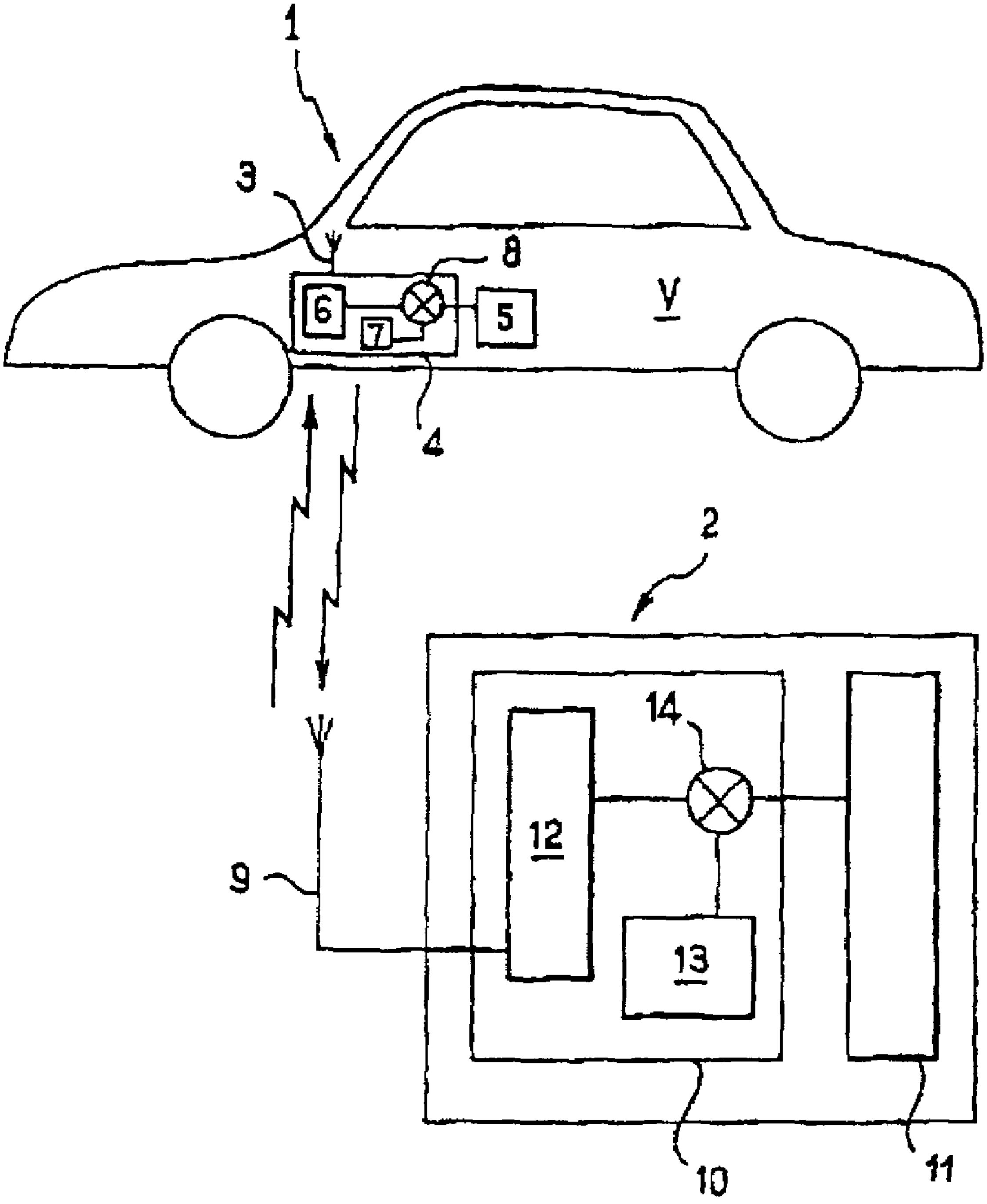
FIG. 1 is a schematic representation illustrating a system in accordance with the invention.

Represented in FIG. 1 is a vehicle V which carries RF transmission/reception means 1 intended to exchange with an RF transmission/reception module 2 carried by a user and taking for example the form of a badge.

The transmission/reception means 1 comprise an antenna 3 disposed for example near a door handle of the vehicle, or in this handle, a management unit 5 as well as signal conversion means 4 interposed between the antenna 3 and the management unit 5.

The signal conversion means 4 comprise in particular means 6 for modulating or demodulating an RF signal transmitted or received by the antenna 3, a circular shift register 7 in which is stored a pseudo-random code, as well as mixer means 8 which are mounted between the management unit 5 and the said modulation/demodulation means 6 and which are able to mix the pseudo-random code with the signal demodulated by the means 6 or with a signal forwarded by the management unit 5. The pseudo-random code of the circular shift register 7 is cyclically permuted with itself at a certain clock frequency.

The badge 2 for its part comprises an antenna 9, a management unit 11 and signal conversion means 10 interposed between the antenna 9 and the management unit 11.

The signal conversion means 10 comprise, in the same way as the means 4, means 12 for modulating or demodulating an RF signal transmitted or received by the antenna 9, a circular shift register 13 in which is stored a pseudo-random code identical to that stored in the register 7, as well as mixer means 14 which are mounted between the management unit 11 and the said modulation/demodulation means 12 and which are able to mix the pseudo-random code with the signal demodulated by the means 12 or with a signal forwarded by the management unit 11. The pseudo-random code of the circular shift register 13 is cyclically permuted with itself at the same clock frequency as that of the shift register 7.

The vehicle V comprises means intended to make it possible to detect the presence of an individual near the vehicle. These means consist for example of sensors disposed in the handles of the doors and making it possible to detect the fact that an individual is advancing his hand toward a handle or is actuating the latter.

When the presence of an individual near the vehicle is detected by these means, the means 1 and the badge 2 synchronize their shift registers 7 and 13, for example by implementing the sequence of exchanges which is described hereinbelow in detail, then the means 1 transmit an RF interrogation signal.

This RF interrogation signal is a signal modulated by the means 6 which implement, for example, a 2-phase NRZ modulation. It carries the pseudo-random code stored in the register 7, mixed with a "challenge" code (key code) which is chosen by the management unit 5 from amongst several possibilities and which will have to determine the response which the badge 2 will have to give.

On receipt of this signal by the antenna 9 of the badge 2, it is demodulated in the reverse sense by the means 12, then mixed with the pseudo-random code of the register 13 by the means 14.

If there is correlation between the two pseudo-random codes, the management unit 11 then receives from the means 14 the key code carried by the RF signal forwarded to the badge 2.

It will be noted that the correlation is a maximum when the RF signal is received by the antenna 9 substantially concomitantly with its transmission by the antenna 3. Conversely, it is a minimum as soon as this is no longer the case and consequently as soon as delays are introduced into the transmission pathway, this necessarily being the case when intermediate transmission/reception means are interposed by ill-intentioned persons between the vehicle and the user.

Figure 2:
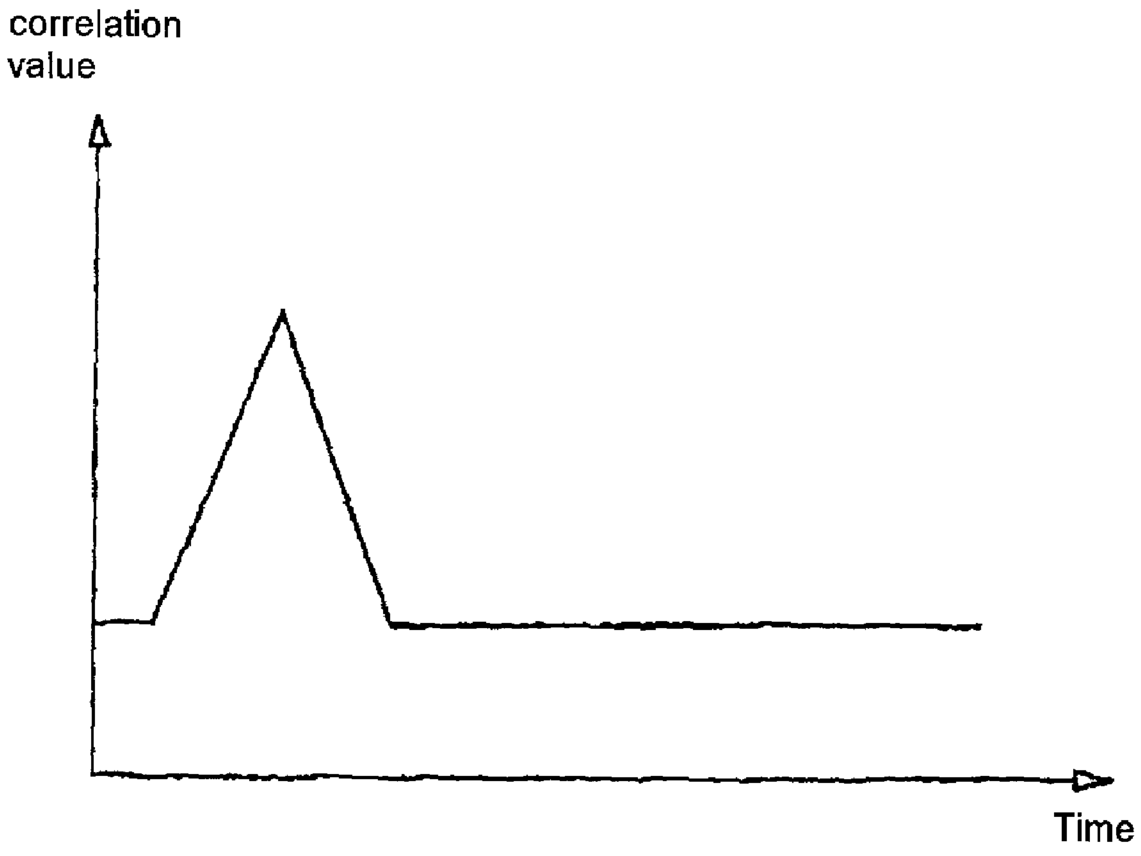
FIG. 2 illustrates the function for correlating the pseudo-random codes cyclically permuted amongst themselves, used in a system of the type of that of FIG. 1.

More exactly, the correlation value varies, as a function of the phase shift between the pseudo-random code carried by the signal received and the pseudo-random code of the shift register 13, in the manner which is illustrated in FIG. 2. It takes its maximum value when the two codes are perfectly synchronized and becomes a minimum for time shifts of at least one bit period. For time shifts of less than one bit period, it varies linearly between its maximum value and its minimum value.

Thus, there is substantially correlation between the two pseudo-random codes, for as long as the code received is shifted in time by less than half a bit period with respect to the code of the shift register 13 of the badge 2.

By way of example, the pseudo-random code can be coded on 127 bits, whilst the shift registers 7 and 13 are traversed at a clock frequency of 5 MHz, this corresponding to bit periods of 200 ns.

Correlations are then obtained at ±30 m from the vehicle, (or subsequently at 7.62 km±30 m or 15.24 km±30 m, etc.)

Once the key code has been recovered, the management unit 11 determines a secret code to be transmitted in the reverse direction. This secret code is a code which the said vehicle V expects to receive and which is dependent on the key code forwarded by the vehicle V.

This secret code is subsequently mixed with the pseudo-random code of the shift register 13, then the signal obtained is modulated by the means 10 and transmitted by the antenna 9.

On receipt of this RF signal by the antenna 3, it is demodulated, then mixed with the pseudo-random code of the shift register 7.

The secret code is then recovered by the management unit 5, if there is correlation between the pseudo-random code carried by the said RF signal. On receipt of this secret code, the management unit 5 verifies that it is indeed the expected code and orders the unlocking of the doors if such is the case.

Conversely, when there is no correlation—which will be the case if intermediate transmission means are introduced into the transmission pathway between the badge 2 and the vehicle V, since these intermediate means will introduce a certain delay between the pseudo-random code carried by the RF signal and that which is cyclically permuted with itself in the shift register 7—the management unit 5 maintains the locking of the doors of the vehicle.

As will have been understood, a system of the type of that just described prevents any deception by ill-intentioned persons who might interpose themselves in the transmission pathway between the badge and the vehicle. It also prevents the possibility that simple retransmission of the pseudo-random code transmitted by the vehicle would be sufficient to trigger the unlocking of the doors, since it demands that the vehicle receive a response which carries the signature of the badge 2. The fact that the response provided by the badge is dependent on a key code forwarded by the vehicle ensures a further level of security.

Variants other than that just described are of course conceivable.

In particular, when a key code is used at the level of the vehicle, the latter might not be mixed with the pseudo-random code but consist of a pseudo-random code chosen from among several which are possible. Likewise, the secret code transmitted by the badge 2 might not be a code mixed with a pseudo-random code, but consist of a pseudo-random code specific to the badge 2, which consequently intrinsically carries the latter's signature. The means 1 then comprise means, synchronized with the badge 2, which are able to de-spread the signal received with this pseudo-random code.

Moreover, a possible sequence for the synchronization between shift registers of the means 1 and of the badge 2 may be as follows.

When the presence of an individual near the vehicle is detected, the vehicle transmits an activation signal intended to wake up the badge 2.

On receipt of this activation signal, the badge 2 transmits an RF signal which carries an identification code mixed with a short pseudo-random signal ("short" to be understood in contradistinction to the long pseudo-random signal, in this instance 127 bits long, used after the synchronization step).

The identification code is used to avoid the situation in which vehicles other than the one concerned respond upon the activation of the badge 2. It is repeated over a period sufficient for the transmission/reception means 1 of the vehicle V to self-synchronize with the pseudo-random signal.

When such is the case, the transmission/reception means 1 transmit a response signal which marks the end of the initialization sequence. So long as this response of the vehicle is not received by the badge 2, the latter repeats the transmission of the signal which carries the identification code mixed with a short pseudo-random signal.

The invention claimed is:

1. A system for controlling locking/unlocking means of at least one openable panel of a vehicle, comprising:

vehicle transmission/reception means (3, 4, 5) carried by the vehicle, comprising vehicle memory means (7) comprising a vehicle circular shift register in which is stored a pseudo-random code;

vehicle transmission means (3, 6, 7) for transmitting an interrogation signal which carries the pseudo-random code; and vehicle de-spreading means (6, 7, 8) for de-spreading a response signal received unless a pseudo-random code carried by the response signal is not synchronized in substantial correlation with a corresponding pseudo-random code stored in the vehicle memory means (7) by a time shift less than required for an intermediate transmission means to intercept and retransmit a response signal, and for verifying whether the received signal carries a signature of a user transmission means; and user transmission/reception means (9, 10, 11) intended to be carried by a user for transmitting the response signal for controlling unlocking actuation of the operable panel, comprising user memory means comprising a user circular shift register (13) in which is stored the pseudo-random code;

user de-spreading means (12, 13, 14) for de-spreading the transmission signal received unless the pseudo-random code carried by the interrogation signal is not synchronized in substantial correlation with a corresponding pseudo-random code stored in the user memory means (13) by a time shift less than required for an intermediate transmission means to intercept and retransmit the interrogation signal; and the user transmission means (9, 12, 13, 14) for transmitting the response signal which carries the pseudo-random code and the signature which is specific to the user transmission/reception means.

2. A system according to claim 1, wherein:

the interrogation signal transmitted by the vehicle transmission/reception means comprises a key code; and the response signal transmitted by the user transmission/reception means comprises a secret code determined by the user transmission/reception means as a function of the key code.

3. A system according to claim 2, wherein the vehicle transmission/reception means further comprise a mixing means for mixing the key code with the pseudo-random code carried by the interrogation signal.

4. A system according to claim 2, wherein the user transmission/reception means further comprise mixing means for mixing the secret code with the pseudo-random code carried by the response signal.

5. A system according to claim 2, wherein at least one of the key code and the secret code comprise the pseudo-random code of the interrogation signal or the response signal.

6. A system according to claim 1, wherein the signature consists of the pseudo-random code of the response signal.

7. A system according to claim 1, wherein the system comprises means for synchronizing the vehicle memory means and the user memory means prior to transmission of the interrogation signal.

8. A system according to claim 7, wherein:

the pseudo-random code comprises a post-synchronization pseudo-random code;

the user transmission/reception means transmits a pre-synchronization pseudo-random code upon activation of the user transmission/reception means; and the vehicle transmission/reception means comprise means for self-synchronizing with the pre-synchronization pseudo-random code transmitted by the user transmission/reception means.

9. A system according to claim 8, wherein the pre-synchronization pseudo-random code is shorter than the post-synchronization pseudo-random code.

10. A system according to claim 9, wherein the post-synchronization pseudo-random code comprises 127-bit codes.

11. A system according to claim 1, wherein the interrogation signals and response signals comprise RF signals modulated by a two-phase NRZ modulation.

12. A system according to claim 1, wherein the vehicle is an automobile.

13. A system according to claim 1, wherein the time shift comprises less than one half of a bit period with respect to the code of the user circular shift register.

14. The system according to claim 1, wherein when said response signal is received after a delay exceeding said time shift, said system prevents unlocking actuation of said operable panel.

15. The system according to claim 13, wherein when said response signal is received after a delay exceeding said half bit period, said system prevents unlocking actuation of said operable panel.

* * * * *